(12) United States Patent  (10) Patent No.: US 8,526,550 B1
Lam et al.  (45) Date of Patent: Sep. 3, 2013

(54) SYSTEM AND METHOD FOR WIDEBAND INTERFERENCE SUPPRESSION

(75) Inventors: Lawrence K. Lam, San Jose, CA (US); Nicholas D. Saiz, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 693 days.

(21) Appl. No.: 12/722,932

(22) Filed: Mar. 12, 2010

Related U.S. Application Data

(60) Provisional application No. 61/162,994, filed on Mar. 24, 2009, provisional application No. 61/161,382, filed on Mar. 18, 2009, provisional application No. 61/162,226, filed on Mar. 20, 2009, provisional application No. 61/180,410, filed on May 21, 2009.

(51) Int. Cl.
 *H04B 1/10* (2006.01)
(52) U.S. Cl.
 USPC ........... 375/346; 375/130; 375/146; 375/147; 375/148; 375/150; 375/260; 375/350
(58) Field of Classification Search
 USPC ................. 375/130, 146–148, 150, 260, 295, 375/346, 350, 354
 See application file for complete search history.

(56) References Cited

U.S. PATENT DOCUMENTS

| | | | |
|---|---|---|---|
| 4,739,518 A | 4/1988 | Bickley et al. | |
| 5,592,178 A | 1/1997 | Chang et al. | |
| 6,016,304 A | 1/2000 | Kyle et al. | |
| 6,894,654 B2 | 5/2005 | Lynch | |
| 7,009,560 B1 | 3/2006 | Lam et al. | |
| 7,016,304 B2 | 3/2006 | Chou et al. | |
| 7,224,717 B1 | 5/2007 | Lam et al. | |
| 7,271,767 B2 | 9/2007 | Londre | |
| 7,483,711 B2 | 1/2009 | Burchfiel | |
| 7,508,865 B2 * | 3/2009 | Miller et al. | 375/150 |

(Continued)

OTHER PUBLICATIONS

Ashok K. Agrawal, Eric L. Holzman; "Beamformer Architectures for Active Phased-Array Radar Antennas"; IEEE Transactions on Antennas and Propagation, Mar. 1999, pp. 432-442, vol. 47, No. 3.

(Continued)

*Primary Examiner* — Daniel Washburn
*Assistant Examiner* — Eboni Hughes
(74) *Attorney, Agent, or Firm* — Fraser Clemens Martin & Miller LLC; J. Douglas Miller

(57) ABSTRACT

A wideband interference suppression system comprises at least one signal conditioning device receiving at least one input signal having a signal of interest portion and an interference signal portion, wherein the at least one signal conditioning device is adapted to provide selective, independent, and variable control of one of a phase, a time delay, an amplitude, a radio frequency signal division, and a radio frequency signal summation of the at least one input signal to produce a modified signal. A tunable cross correlator receives a signal representative of the modified signal and is adapted to estimate one of an amplitude, a time delay and a phase delay parameter of the interference signal portion and to generate a control logic signal therefrom, wherein the control logic signal is received by the at least one signal conditioning device for independently and selectively activating and adjusting the various components thereof to suppress the interference signal portion.

18 Claims, 2 Drawing Sheets

(56) References Cited

U.S. PATENT DOCUMENTS

| | | | |
|---|---|---|---|
| 8,401,509 B1* | 3/2013 | Gupta et al. ............... | 455/296 |
| 2003/0016174 A1* | 1/2003 | Anderson ................... | 342/378 |
| 2003/0142640 A1* | 7/2003 | Pajukoski et al. ............ | 370/321 |
| 2003/0194979 A1* | 10/2003 | Richards et al. ............. | 455/216 |
| 2004/0080705 A1 | 4/2004 | Koh et al. | |

OTHER PUBLICATIONS

Himanshu Khatri, Prashad S. Gudem, Lawrence E. Larson; "Integrated RF Interference Suppression Filter Design Using Bond-Wire Inductors"; IEEE Transactions on Microwave Theory and Techniques, May 2008, pp. 1024-1034, vol. 56, No. 5.

* cited by examiner

SYSTEM AND METHOD FOR WIDEBAND INTERFERENCE SUPPRESSION

STATEMENT REGARDING FEDERALLY SPONSORED RESEARCH OR DEVELOPMENT

Not applicable.

CROSS-REFERENCE TO RELATED APPLICATIONS

The present application claims priority to the following: U.S. Provisional Application Ser. No. 61/161,382 filed Mar. 18, 2009; U.S. Provisional Application Ser. No. 61/162,226 filed Mar. 20, 2009; U.S. Provisional Application Ser. No. 61/162,994 filed Mar. 24, 2009; and U.S. Provisional Application Ser. No. 61/180,410 filed May 21, 2009. Each of the foregoing Applications is incorporated by reference herein in its entirety.

FIELD OF THE INVENTION

The invention relates to interference suppression. In particular, this invention relates to a system and method to provide a time delay, a phase delay and an amplitude based cancellation circuit to suppress wideband interference.

BACKGROUND OF THE INVENTION

Radio frequency ("RF") signal receivers must distinguish between a primary or desired signal and any interfering signal. In some instances, the interfering signal unintentionally results from adjacent communication channels overflowing into the desired communication channel. Additionally, the usable radio spectrum is highly populated, and occupied communication channels can potentially act as interferers within a desired wideband communication channel. In other instances, such as radar detection systems, the interference may be intentionally applied as a jamming or electronic counter measures signal designed to prevent acquisition of the primary or desired signal.

Many methods are known to suppress interfering signals. Known methods use discrete components to implement a time delay to an interfering signal, and then apply summation components to cancel the interfering signal. As a non-limiting example, U.S. Pat. No. 4,739,518 discloses a method of interference suppression that utilizes a direct down-conversion of the received signal, which is then divided into two separate RF signals. The RF signals are fed along two complimentary paths, where one signal is limited in amplitude and the other is amplified and delayed. The two signals are then subtracted from one another, greatly reducing the interfering signal while only slightly affecting the desired portion of the received signal.

The most common approaches to interference suppression provide filtering of the signal to suppress interference, particularly in instances where poor isolation between the transmit path and the receive path in a communication system causes leakage of the transmit path to the receive path. Thus, for example, band-pass filters and bond-wire inductors are used to filter out interference caused by jammers and transmit path leakage. In general, such filtering methods are only feasible for low frequency operations, and are limited by the low quality factors of integrated inductors and capacitors used to create the filtering.

Complex notch filtering is also known. U.S. Pat. No. 5,592,178 discloses a method that applies a predetermined complex weight in terms of amplitude and phase to each transmit/receive module at the element level to produce a notch in the spectrum in the direction of the interfering signal. The notch is controlled using complex digital signal processing control logic applied using multiple discrete components. Specifically, time delay units and phase shift circuits are incorporated separately in two subsystems. When a time delay is required, the time delay unit is adjusted, which has the effect of inducing a phase change. As a result, the phase shift circuits in the other sub-system must be adjusted to compensate for the change in the time delay unit.

Recently, the digital signal processing has become increasingly complex. U.S. Pat. No. 7,483,711 discloses an interference suppression method that suppresses interference through complex sampling and modeling of a communication channel with interference. The model then returns an optimal waveform to a network node using complex digital signal processing, filtering and waveform generation to return a spectrum free of interference. Multiple different components and test equipment are utilized to provide the complicated interference suppression.

It is therefore desirable to develop a system and method for interference suppression that eliminates the need for filtering and for complicated digital signal processing and modeling while minimizing the complexity of the system. It is also desirable that the system and method be implemented without requiring multiple discrete components, both to reduce cost and to minimize the size and power requirements of the interference suppression system and method.

SUMMARY OF THE INVENTION

Concordant and consistent with the present invention, a wideband interference suppression system and method has been discovered. The wideband interference suppression system comprises at least one signal conditioning device receiving at least one input signal having a signal of interest portion and an interference signal portion, wherein the at least one signal conditioning device is adapted to provide selective, independent, and variable control of one of a phase delay, a time delay, an amplitude, a radio frequency signal division, and a radio frequency signal summation of the at least one input signal to produce a modified signal. A tunable cross correlator receives a signal representative of the modified signal and is adapted to estimate one of an amplitude, a time delay and a phase delay parameter of the interference signal portion and to generate a control logic signal therefrom, wherein the control logic signal is received by the at least one signal conditioning device for independently and selectively activating and adjusting the various components thereof to suppress the interference signal portion.

In one embodiment, the tunable cross correlator determines at least one of: the relative amplitude difference between the signal of interest portion and the interference signal portion; the relative time delay difference between the signal of interest portion and the interference signal portion; and the relative phase difference between the signal of interest portion and the interference signal portion.

In another embodiment, the control logic signal adjusts to maximize a signal to interference and noise ratio in the modified signal.

In another embodiment, a wideband interference suppression system comprises a first signal conditioning device receiving a first input signal having a first signal of interest portion and a first interference signal portion, wherein the first signal conditioning device is adapted to provide selective, independent, and variable control of one of a phase, a time delay, an amplitude, a radio frequency signal division, and a radio frequency signal summation of the first input signal to produce a first modified signal, and a second signal conditioning device receiving a second input signal having a second signal of interest portion and a second interference signal portion, wherein the second signal conditioning device is adapted to provide selective, independent, and variable control of one of a phase, a time delay and an amplitude of the second input signal to produce a second modified signal. A tunable cross correlator receives a signal representative of the first modified signal, and is adapted to estimate one of the amplitude, time delay and phase delay parameters of the first interference signal portion and to generate a first control logic signal therefrom, wherein the first control logic signal is received by the first signal conditioning device for independently and selectively activating and adjusting the various components thereof. A power combiner receives and combines the first and second modified signals to generate an output signal.

A wideband interference suppression method is also disclosed.

The present invention suppresses signal interference in a wideband communication channel of interest, such that the mitigating effects are minimal. Band-pass filters are eliminated, making the invention applicable to all frequency ranges. Time delay, phase delay, and amplitude control are incorporated within the signal conditioning device with independent control, thereby eliminating multiple separate components and simplifying the system and interference suppression control architecture. The present invention may be implemented as radio frequency integrated circuits having minimal size and power requirements. Eliminating components lowers cost, and creates more compact implementations of the invention.

Additionally, the present invention is far less complex than prior art solutions, while resulting in an interference free wideband spectrum. The present invention does not use digital signal processing algorithms like those found in the prior art. Moreover, the proposed invention is ideal for use in phased array antenna, multi-in-single-output (MISO) systems, and/or multi-in-multi-out (MIMO) systems.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
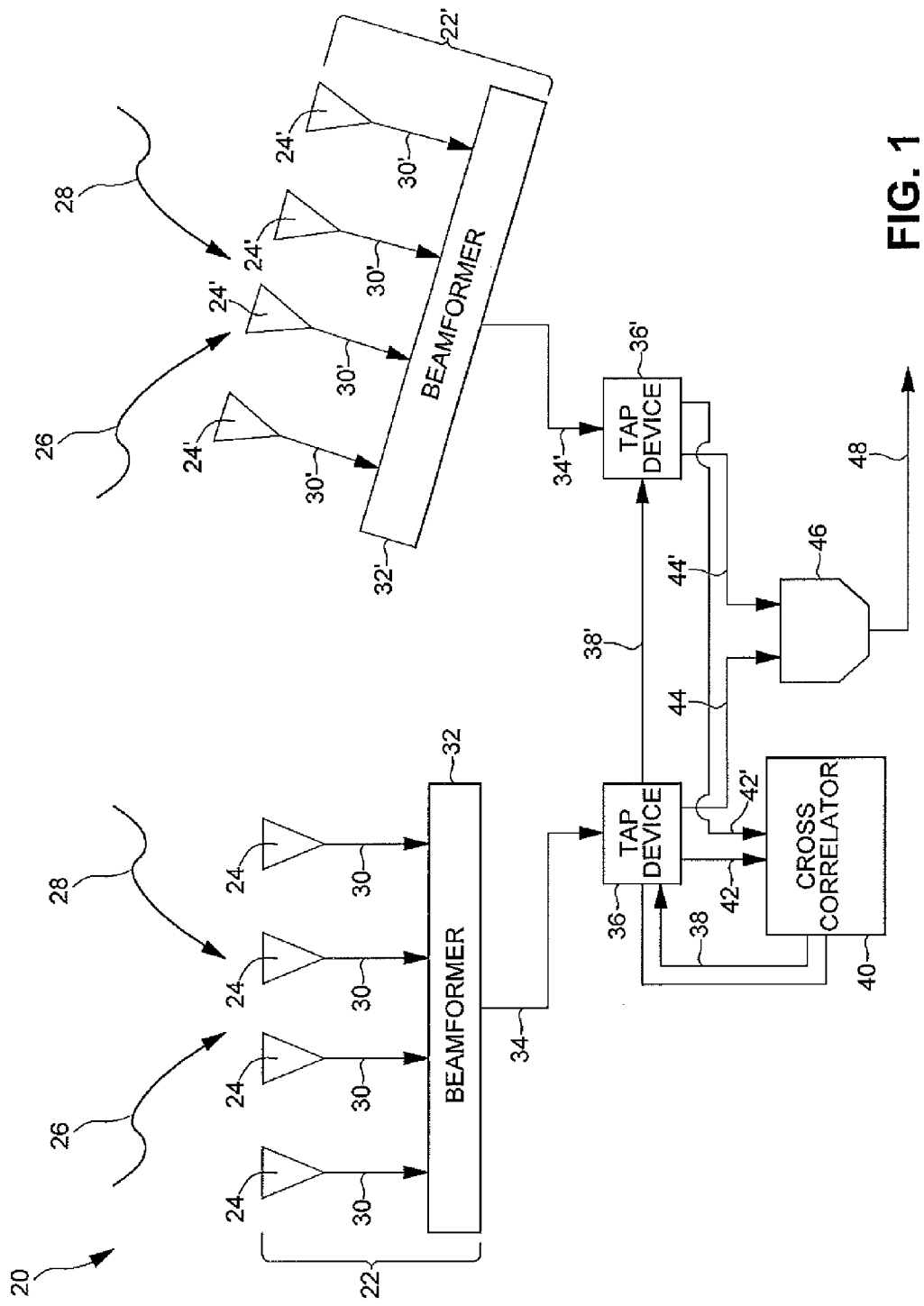
FIG. 1 is a simplified block diagram of a Multi-In-Single-Out (MISO) wideband interference suppression system for an adaptive variable true time delay beamforming method adapted to receive a signal and generate a single output according to the invention.

FIG. 1 illustrates a wideband interference suppression system 20 wherein a first antenna array 22 including multiple antenna elements 24 receives a wideband signal that includes a signal of interest portion 26 and an interference signal portion 28 combined together as a plurality of received signals 30. A beamformer 32 combines the received signals 30 into a coherent signal 34 that is received by a signal conditioning device 36, which provides selective, independent, and variable control over a time delay, an amplitude, a phase delay, RF signal summation, and RF signal division as required by the wideband interference suppression system 20 to produce a modified signal 44. A tunable cross correlator 40 receives a signal 42 representative of the modified signal 44 and is adapted to estimate one of an amplitude, a time delay and a phase delay parameter of the interference signal portion 28 of the signal 42. Based on the estimation, the tunable cross correlator 40 generates a control logic signal 38 that is sent to the signal conditioning device 36 for independently and selectively activating and adjusting the various components thereof to suppress the interference signal portion 28.

However, best results have been obtained when multiple received signals are compared by the tunable cross correlator 40. Thus, FIG. 1 further shows a MISO wideband interference suppression system. A second antenna array 22' including multiple antenna elements 24' also receives the wideband signal that includes the signal of interest portion 26 and the interference signal portion 28. It is understood that the number of antenna arrays may be more or less than two as desired for any particular configuration. It is further understood that the present invention applies if the antenna elements 24, 24' are diverse or not diverse, depending upon the specific application.

The signals 30, 30' received by the antenna elements 24, 24' are subsequently received by respective beamformers 32, 32'. The beamformers 32, 32' may be any conventionally known beamformer, including diversity true time delay beamformers. As a non-limiting example, one beamforming system adapted for use as the beamformers 32, 32' is fully described in commonly owned U.S. patent application Ser. No. 12/722,670 entitled "True Time Delay Diversity Beamforming", filed on Mar. 12, 2010 and incorporated by reference herein in its entirety.

The beamformers 32, 32' respectively output coherent signals 34, 34' that combine the signal of interest portion 26 with the interference signal portion 28. The coherent signals 34, 34' are further received by respective signal conditioning devices 36, 36'. The signal conditioning devices 36, 36', also known as time amplitude phase control ("TAP") devices, are fully described in commonly owned U.S. patent application Ser. No. 12/722,625 entitled "Variable Time, Phase, And Amplitude Control Device", filed on Mar. 12, 2010 and incorporated herein by reference in its entirety.

Each of the TAP devices 36, 36' provides selective, independent, and variable control over a time delay, an amplitude, and a phase of a radio frequency signal. Each of the TAP devices 36, 36' is also configured to implement RF signal summation and RF signal division as required by the wideband interference suppression system 20. According to one embodiment of the invention, each of the TAP devices 36, 36' is implemented as a packaged radio frequency integrated circuit (RFIC). Since the TAP devices combine time delay, amplitude control and phase delay, as well as RF summation and division, onto a packaged RFIC, many separate and discrete components that perform each task individually are eliminated, which reduces the package size and power requirements of the system.

To accomplish selective, independent and variable control over a time delay, an amplitude, and a phase delay of a radio frequency signal, each of the TAP devices 36, 36' is adapted to receive a respective control logic signal 38, 38'. The control logic signals 38, 38' provide each respective TAP device 36, 36' with logic for independently and selectively activating and adjusting the various components of the TAP devices 36, 36' to generate a modified signal 42, 42'. It is understood that the modified signals 42, 42' may be identical to the coherent signals 34, 34' in certain instances where the control logic signals 38, 38' do not require additional independent and selective activation and adjustment of the various components of the TAP devices 36, 36', such as when the interference signal component 28 is fully suppressed, or when the coherent signals 34, 34' are initially received. The control logic signals 38, 38' may also command any of a variety of other suitable functions for the respective TAP devices 36, 36', such as RF signal summation and division or other mathematical operations.

The control logic signals 38, 38' are generated as an output of a tunable cross correlator 40. The tunable cross correlator 40 receives respective modified signals 42, 42' from the TAP devices 36, 36', and estimates the amplitude, time delay and phase delay parameters of the interference signal portion 28 as a function of the modified signals 42, 42'. Alternatively, the tunable cross correlator 40 may estimate the amplitude, time delay and phase delay parameters required for suppressing the interference signal portion 28 of the received signal. The tunable cross correlator 40 generates the control logic signals 38, 38', which are then transmitted back to the respective TAP devices 36, 36' for independently and selectively activating and adjusting the various components of the TAP devices 36, 36'.

The TAP devices 36, 36' also provide respective modified signals 44, 44' to a two way power combiner 46. The modified signals 44, 44' may be identical to the output signals 42, 42', and may further result from RF signal division within the respective TAP devices 36, 36'. The two way power combiner 46 sums the modified signals 44, 44' to create a coherent output signal 48. The TAP devices 36, 36' shown in FIG. 1 are depicted as single input, dual output devices. In such a configuration, it is understood that the outputs 42, 44 of the TAP device 36 may be identical as a result of RF signal division that may occur within the TAP device 36. Similarly, it is understood that the outputs 42', 44' of the TAP device 36' may be identical as a result of RF signal division that may occur within the TAP device 36'. Alternatively, the TAP devices 36, 36' may respectively provide only a single modified signal 44, 44' to the two way power combiner 46, and the signals 42, 42' may be sampled signals representative of the modified signals 44, 44'.

The tunable cross correlator 40 may be any device known in the art for estimating the amplitude, time delay and phase delay parameters of the interference signal portion 28. As a non-limiting example, one cross correlator adapted for use as the tunable cross correlator 40 is fully described in commonly owned U.S. Pat. No. 7,224,717 entitled "System and Method For Cross Correlation Receiver", incorporated by reference herein in its entirety.

The tunable cross correlator 40 may be implemented using one or more field programmable gate array circuits in combination with a tunable dual channel digital receiver. In FIG. 1, the tunable cross correlator 40 is depicted as a narrow band dual channel tunable cross correlator. The first channel receives the output signal 42 of the TAP device 36, and generates the control logic signal 38 that provides variable and continuous feedback to the TAP device 36. The second channel of the tunable cross correlator 40 receives the output signal 42' of the TAP device 36', and generates the control logic signal 38' that provides variable and continuous feedback to the TAP device 36'.

In operation, the dual channel tunable cross correlator 40 receives the output signals 42, 42' from the respective TAP devices 36, 36', and determines at least one of: the relative amplitude difference between the two signals 42, 42'; the relative time delay difference between the two signals 42, 42'; and the relative phase delay difference between the two signals 42, 42'. Based on the determined differences, the tunable cross correlator 40 can then produce the control signals 38, 38' that include the optimal parameters required to program the TAP devices 36, 36' to attain optimal suppression of the interference signal portion of the received signal.

It is understood that a plurality of algorithms may be implemented by the tunable cross correlator 40 to convert the difference measurements described above into optimized control logic signals 38, 38' for the respective TAP devices 36, 36'. Best results have been obtained where the algorithm evaluates the relative amplitudes and the time delay differences of the interference signal portions of the signals 42, 42' and generates the control logic signals 38, 38' such that the TAP devices 36, 36' set those parameters of the interference signal portion equally within the modified signals 44, 44' received by the two way power combiner 46. Additionally, the phase delay controls of the TAP devices 36, 36' are set to cause the interference signal portions within the modified signals 44, 44' to be 180 degrees out of phase between the two modified signals 44, 44'. As a result, the interference signal portions of the modified signals 44, 44' are cancelled within the two way power combiner 46, and the output signal 48 contains only minimal interference signal portions. By controlling the TAP devices 36, 36' so that the interference signal portion of the received signal is cancelled in the output signal 48, a signal to interference and noise ratio (SINR) is maximized in the output signal 48. For wideband interference suppression, the SINR is maximized across an entire specified frequency band.

The MISO wideband interference suppression system 20 shown in FIG. 1 may be easily modified to accommodate single antenna aperture systems, phased array antenna systems, and MIMO systems, and may also be adapted to support wireless local networking applications. By way of example, the two way power combiner 46 may be eliminated to enable multiple outputs based on the modified signals 44, 44'. Additionally, it is understood that multiple independent or interdependent cross correlators may be utilized in place of the dual channel tunable cross correlator 40.

In a single antenna array system embodiment, a single antenna array 22 receives the signal of interest portion 26 and the interference signal portion 28 combined together as a plurality of received signals 30. A beamformer 32 combines the received signals 30 into a coherent signal 34 that is received by the TAP device 36, which provides selective, independent, and variable control over a time delay, an amplitude, a phase delay, RF signal summation, and RF signal division as required by the wideband interference suppression system 20 to produce a modified signal 44. A tunable cross correlator 40 receives a signal 42 representative of the modified signal and is adapted to estimate one of an amplitude, a time delay and a phase delay parameter of the interference signal portion 28 of the signal 42. Based on the estimation, the tunable cross correlator 40 generates a control logic signal 38 that is sent to the TAP device 36 for independently and selectively activating and adjusting the various components thereof to suppress the interference signal portion 28.

Figure 2:
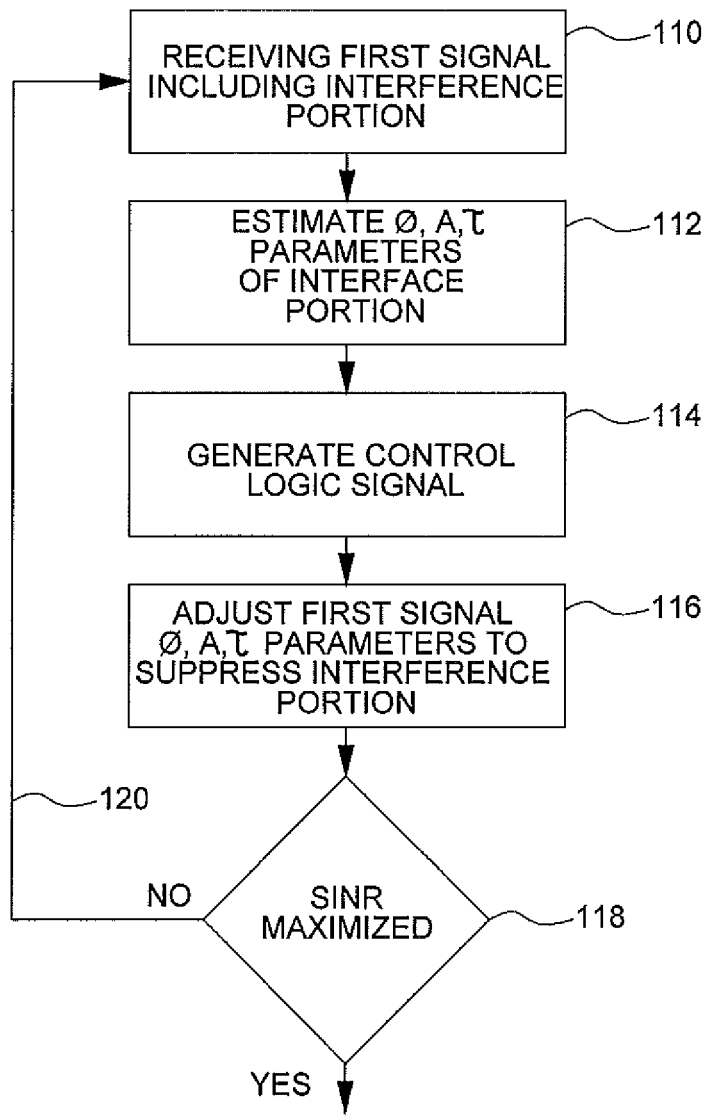
FIG. 2 is a simplified block diagram for a method of wideband interference suppression according to the present invention.

An exemplary wideband interference suppression method is illustrated in FIG. 2, and will be described with reference to the wideband interference suppression system of FIG. 1. Wideband interference suppression is initiated by receiving a first signal 42 at step 110 that includes a signal of interest portion 26 and an interference signal portion 28. While the following description refers to the first signal 42, it is understood that the first signal also may be received by the tunable cross correlator 40 as the coherent signal 34.

At step 112, the tunable cross correlator 40 evaluates at least one of a phase delay ($\phi$) parameter, an amplitude (A) parameter, and a time delay ($\tau$) parameter of the interference signal portion 28. In one embodiment of step 112, the tunable cross correlator 40 estimates the amplitude, time delay and phase delay parameters of the interference signal portion 28 as a function of the first signal 42. In another embodiment of step 112, the tunable cross correlator 40 may estimate the amplitude, time delay and phase delay parameters required for suppressing the interference signal portion 28 of the first signal 42. In another embodiment of step 112, the tunable cross correlator may precisely determine at least one of the relative amplitude difference between the signal of interest portion 26 and the interference signal portion 28; the relative time delay difference between the signal of interest portion 26 and the interference signal portion 28; and the relative phase delay difference between the signal of interest portion 26 and the interference signal portion 28.

Based upon the evaluation of step 112, the tunable cross correlator 40 generates the control logic signal 38 at step 114, which is transmitted to the TAP device 36. At step 116, the TAP device 36 independently and selectively adjusts the various components of the TAP device 36 to modify at least one of a phase delay ($\phi$) parameter, an amplitude (A) parameter, and a time delay ($\tau$) parameter of the interference signal portion 28 of the first signal 42 to achieve suppression of the interference signal portion 28 of the first signal 42.

In another embodiment of the wideband interference suppression method, a modified first signal is evaluated at step 118 as part of a feedback loop 120. In step 118, a signal to interference and noise ratio (SINR) of the modified first signal 42 is evaluated. If the SINR is not maximized, the modified first signal may continue to be operated upon via the method steps previously described via the feedback loop 120. By controlling the TAP devices 36, 36' to maximize the SINR, the interference signal portion 28 of the first signal is cancelled. For wideband interference suppression, the SINR is maximized across an entire specified frequency band.

In an additional embodiment to the method of FIG. 2, the step 110 of receiving at least one first signal may include receiving two or more first signals, such as signals 42, 42' (or coherent signals 34, 34' as desired) from respective TAP devices 36, 36'. According to this embodiment, the step 112 includes estimating at least one of a phase delay ($\phi$) parameter, an amplitude (A) parameter, and a time delay ($\tau$) parameter of the interference signal portion 28 of the first signals 42, 42'. In step 114, the tunable cross correlator 40 generates the control logic signals 38, 38' such that the TAP devices 36, 36' sets the amplitude (A) and the time delay ($\tau$) parameters of the interference signal portion 28 equally within the modified signals 44, 44' received by the two way power combiner 46. Additionally, the phase delay controls of the TAP devices 36, 36' are instructed by the control logic signals 38, 38' to adjust the phase delay ($\phi$) parameters to cause the interference signal portion 28 within the modified signals 44, 44' to be 180 degrees out of phase between the two modified signals 44, 44'. As a result, the interference signal portion 28 of the respective modified signals 44, 44' is cancelled at step 116 within the two way power combiner 46, and the output signal 48 contains only minimal interference signal portions. In step 118, a signal to interference and noise ratio (SINR) of the output signal 48 is evaluated. If the SINR is not maximized, the modified first signal may continue to be operated upon via the method steps previously described via the feedback loop 120. By controlling the TAP devices 36, 36' so that the interference signal portion of the received signal is cancelled in the output signal 48, a signal to interference and noise ratio (SINR) is maximized in the output signal 48. For wideband interference suppression, the SINR is maximized across an entire specified frequency band.

The wideband suppression system and method of the present invention is far less complex than prior art methods and provides a substantially interference-free wideband radio frequency spectrum. The present invention applies relatively simple mathematical manipulation of the interference signal portion 28 applied through the TAP devices 36, 36' that control amplitude, phase delay and time delay, and may further include RF signal divider and combiner functions. The functionality of the TAP devices 36, 36' enables elimination of multiple separate and discrete components, eliminates the need for digital signal processing and modeling, and simplifies the system architecture and interference suppression control architecture. All precision measurements are accomplished using the tunable cross correlator 40 to estimate the parameters, including amplitude, time and phase delay controls that are required to suppress interference. With the possible exception of the antenna arrays 22, 22', all components of the present invention may be fabricated as a single RFIC, further reducing the size and power requirements of the wideband interference suppression system 20. Finally, the present invention may be manufactured using the latest low-cost manufacturing RFIC manufacturing techniques. As a non-limiting example, the present invention may be manufactured at relatively low cost by utilizing SiGe BiCMOS or 65 nm RF/digital CMOS technologies.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A wideband interference suppression system, comprising:
   a first signal conditioning device for receiving a first input signal having a first signal of interest portion and a first interference signal portion, wherein the first signal conditioning device is adapted to provide selective, independent, and variable control of at least one of a phase delay, a time delay, an amplitude, a radio frequency signal division, and a radio frequency signal summation of the first input signal to produce a first modified signal;
   a second signal conditioning device for receiving a second input signal having a second signal of interest portion and a second interference signal portion, wherein the second signal conditioning device is adapted to provide selective, independent, and variable control of at least one of a phase delay, a time delay and an amplitude of the second input signal to produce a second modified signal;
   and a tunable cross correlator for receiving;
   the first modified signal, the tunable cross correlator adapted to estimate one of the amplitude, time delay and phase delay parameters of the first interference signal portion and to generate a first control logic signal therefrom, wherein the first control logic signal causes the first signal conditioning device to selectively adjust the at least one of the amplitude, the time delay and the phase delay of the first interference signal portion to suppress the first interference signal portion; and the second modified signal, the tunable cross correlator adapted to estimate at least one of the amplitude, time delay and phase delay parameters of the second interference signal portion and to generate a second control logic signal therefrom, wherein the second control logic signal causes the second signal conditioning device to selectively adjust the at least one of the amplitude, the time delay and the phase delay of the second interference signal portion to suppress the second interference signal portion;

wherein, the tunable cross correlator is configured to determine at least one of: a relative amplitude difference between the first and second interference signal portions; a relative time delay difference between the first and second interference signal portions; and a relative phase delay difference between the first and second interference signal portions;

the first control logic signal and the second control logic signal are adjustable to equalize at least one of the amplitude and the time delay of the first and second interference signal portions; and the first control logic signal and the second control logic signal are adjustable to set the phase delay of the first interference signal portion 180 degrees out of phase with the second interference signal portion to cancel the first interference portion with the second interference portion in a power combiner.

2. The wideband interference suppression system of claim 1, further comprising a power combiner for receiving and combining the first and second modified signals to generate an output signal.

3. The wideband interference suppression system of claim 2, wherein the first control logic signal is adjusted by the tunable cross correlator to maximize a signal to interference and noise ratio in the output signal.

4. The wideband interference suppression system of claim 1, wherein the first and second control logic signals are adjusted by the tunable cross correlator to maximize a signal to interference and noise ratio in an output signal.

5. A wideband interference suppression method, comprising:

receiving a first input signal, wherein the first input signal includes a first signal of interest portion and a first interference signal portion;
evaluating at least one of a phase delay, an amplitude, and a time delay of the first interference signal portion with a tunable cross correlator;
generating a first control logic signal;
adjusting a first signal conditioning device based on the first control logic signal to provide selective, independent, and variable control of the at least one of the phase delay parameter, the amplitude parameter, and the time delay parameter of the first interference signal portion to generate a first modified signal;
receiving a second input signal, wherein the second input signal includes a second signal of interest portion and a second interference signal portion;
evaluating at least one of a phase delay, an amplitude, and a time delay of the second interference signal portion using the tunable cross correlator, and determining at least one of: a relative amplitude difference between the first and second interference signal portions; a relative time delay difference between the first and second interference signal portions; and the relative phase delay difference between the first and second interference signal portions;
generating a second control logic signal;
adjusting a second signal conditioning device based on the second control logic signal to provide selective, independent, and variable control of the at least one of the phase delay, the amplitude, and the time delay of the second interference signal portion to generate a second modified signal;
combining the first and second modified signals to form an output signal; and
adjusting the first and second control logic signals to maximize a signal to interference and noise ratio in the output signal, equalizing at least one of the amplitude and the time delay of the first and second interference signal portions, and adjusting the phase delay of the first interference signal portion 180 degrees out of phase with the second interference signal portion to cancel the first interference portion with the second interference portion in the combining step.

6. The wideband interference suppression method of claim 5, wherein the evaluating step further comprises estimating one of the phase delay, the amplitude, and the time delay of the first interference signal portion.

7. The wideband interference suppression method of claim 5, wherein the evaluating step further comprises estimating the phase delay, the amplitude, or the time delay required for suppressing the first interference signal portion of the first signal.

8. A wideband interference suppression system, comprising:

a first signal conditioning device configured to receive:
a first input signal having a signal of interest portion and an interference signal portion; and
a first control logic signal including logic for independently and selectively activating and adjusting the first signal conditioning device;
wherein, the first signal conditioning device is configured to provide selective, independent, and variable control of at least one of a phase delay, a time delay, and an amplitude of the first input signal to produce a first modified signal;

a second signal conditioning device configured to receive:
a second input signal having the signal of interest portion and the interference signal portion; and
a second control logic signal including logic for independently and selectively activating and adjusting the second signal conditioning device;
wherein, the second signal conditioning device is configured to provide selective, independent, and variable control of at least one of a phase delay, a time delay, and an amplitude of the second input signal to produce a second modified signal; and a tunable cross correlator configured to receive the first modified signal and the second modified signal and estimate one of:
an amplitude, a time delay, and a phase delay of the interference signal portion of the first modified signal and the second modified signal; and
an amplitude, a time delay and a phase delay for suppressing the interference signal portion of the first modified signal and the second modified signal;
wherein, the tunable cross correlator is configured to generate the first control logic signal and the second control logic signal.

9. The system of claim 8, wherein the first signal conditioning device and the second signal conditioning device are each configured to implement radio frequency signal summation and radio frequency signal division as required by the wideband interference suppression system.

10. The system of claim 9, wherein the first control logic signal and the second control logic signal command one &radio frequency signal summation and radio frequency signal division for the respective first and second signal conditioning devices.

11. The system of claim 8, further comprising a two way power combiner configured to receive the first modified signal and the second modified signal.

12. The system of claim 11, wherein the two way power combiner is configured to sum the first modified signal and the second modified signal to create a coherent output signal.

13. The system of claim 8, wherein the first signal conditioning device and the second signal conditioning device are each a radio frequency integrated circuit.

14. The system of claim 8, wherein the tunable cross correlator comprises at least one field programmable gate array circuit in combination with a tunable dual channel digital receiver.

15. The system of claim 8, wherein the tunable cross correlator is configured to receive the first modified signal and the second modified signal and determine at least one of:
the relative amplitude difference between the first modified signal and the second modified signal; the relative time delay difference between the first modified signal and the second modified signal; and the relative phase delay difference between the first modified signal and the second modified signal.

16. The system of claim 15, wherein the tunable cross correlator is configured to produce the first control logic signal and the second control logic signal to maximize suppression of the interference signal portion.

17. The system of claim 8, wherein the first signal conditioning device and the second signal conditioning device each configured to cause the interference signal portion within each of the first modified signal and the second modified signal to be 180 degrees out of phase between the first modified signal and the second modified signal.

18. The system of claim 17, wherein the system does not include a band-pass filter.

* * * * *